Jan. 17, 1950     T. F. SCHLICKSUPP     2,494,633
VALVE
Filed July 31, 1946
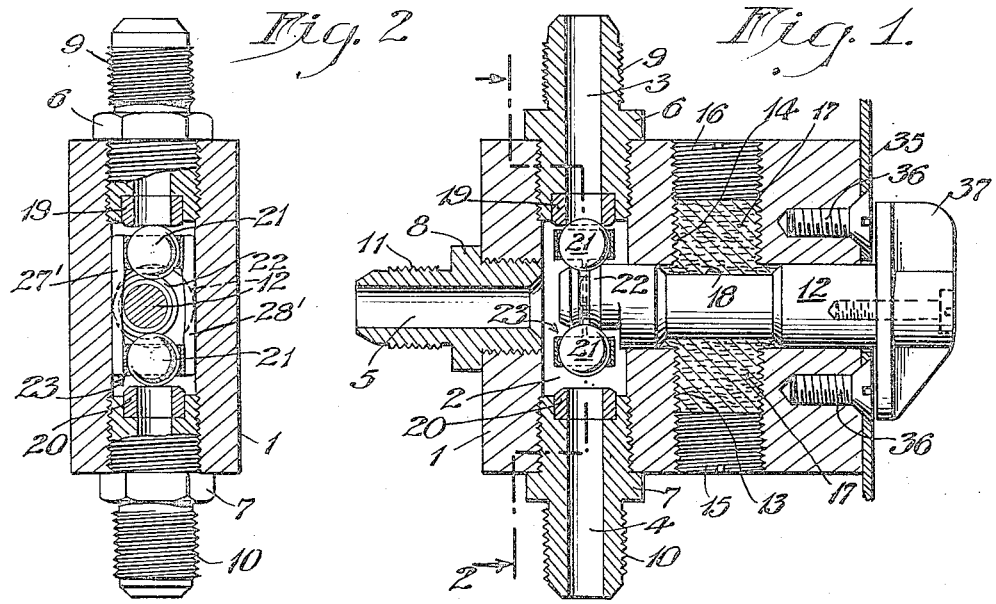
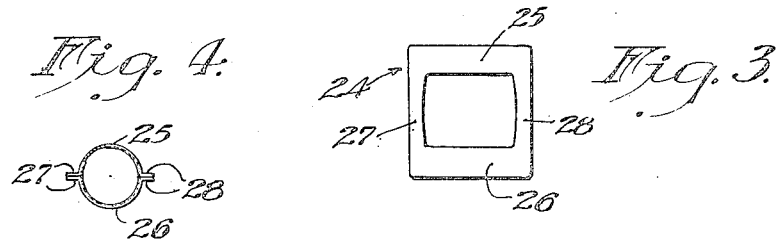
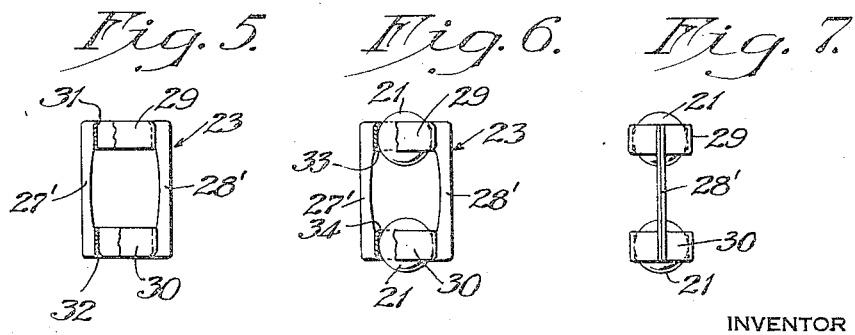
INVENTOR
THEODORE F. SCHLICKSUPP
BY
ATTORNEYS Patented Jan. 17, 1950

2,494,633

UNITED STATES PATENT OFFICE 2,494,633

VALVE

Theodore F. Schlicksupp, Long Island City, N. Y.

Application July 31, 1946, Serial No. 687,459

4 Claims. (Cl. 277—13)

This invention relates to valves, and more particularly to valves of the three-way type.

A common type of three-way valve has a conical plug which is rotatable to control the flow of fluid. A valve of this kind is usually difficult to turn, especially after it has been in use for some time. It has been proposed to make a three-way valve in which the ports are controlled by loose balls actuated by turning a rotary stem as hereinafter described. Such a valve can be turned easier than a valve of the conical plug type, but in its proposed form it is not positive acting and the balls are not properly confined and guided. A portion of the stem rotates between two balls and this portion of the stem has a recess in one side of it into which one or the other of the balls can drop when the stem is turned. These two balls act on two coil springs the outer ends of which press on two other balls which serve as valve elements that are thus yieldingly urged toward closed position by the springs. By rotating the stem either of the inner balls can be made to enter the recess in the stem, thus allowing it to move inwardly to relieve some of the pressure on its spring, which then allows the corresponding outer ball to be moved away from its seat by the fluid pressure, the other outer ball being held seated against the fluid pressure by its spring, the pressure upon which has not been lessened by the corresponding inner ball since it is now engaging an unrecessed portion of the stem. Thus each ball-valve is spring seated against the fluid pressure and is opened by the fluid pressure when the pressure on the spring is slightly relieved. The valves are neither positively closed nor positively opened.

The principal object of the present invention is to provide a valve of the loose-ball type which is easy to turn and in which the balls that act as valve elements are positively seated and positively unseated.

A further object is to provide an improved three-way valve of the loose-ball type.

A valve embodying the invention is illustrated in the accompanying drawing, in which:

Figure 1 is a vertical section through the valve;

Fig. 2 is a vertical transverse section taken on the line 2—2 of Fig. 1 but showing the balls moved to a different position;

Fig. 3 is a side elevation of one type of blank which may be formed and then assembled in pairs to produce the ball retainer;

Fig. 4 is a top plan view of the ball retainer;

Fig. 5 is a front elevation, partly in section, of the ball retainer;

Fig. 6 is a front elevation, partly in section, of the completed ball retainer with the balls positioned in it; and Fig. 7 is a side elevation of the completed ball retainer shown in Fig. 6.

Referring first to Figure 1, the improved valve comprises a body 1 which may be a block of metal or other suitable material. The body has a cylindrical valve chamber 2 whose axis is vertically disposed when the valve body is oriented as shown in the drawing. Three fluid passages 3, 4 and 5 communicate with the chamber 2. In the particular valve illustrated, the passages 3 and 4 are oppositely disposed and enter the upper and lower ends of the cylindrical valve chamber while the passage 5 enters the side of the valve chamber. These passages may be formed directly in the block of metal but are preferably formed in connector members 6, 7 and 8, respectively, threaded into the body 1 and having threaded outer ends 9, 10 and 11, to which fluid conducting pipes may be connected. The valve body is bored to receive a rotatable shaft or valve stem 12. The shaft may be held against endwise movement in the valve body and may be packed to prevent the escape of fluid around it in any suitable way. For instance, the valve body 1 may be provided with openings 13 and 14 extending radially toward the shaft, the outer ends of which are closed by adjustable plugs 15 and 16 threaded into the openings. Any suitable type of packing compound 17 is placed in the openings 13, 14 and compressed against the shaft 12 by turning the plugs 15 and 16. The portion of the shaft 12 adjacent the inner ends of the packing openings is preferably recessed as shown at 18 so that the packing compound forced into the recess acts as a key to prevent axial movement of the shaft. There is very little load on the shaft tending to shift it axially so this arrangement is sufficient to hold the shaft against endwise movement.

The inner ends of the connectors 6 and 7 carry valve seats 19 and 20, respectively, which may be made of copper or any other suitable material. A pair of stainless steel balls 21 act as valve elements and cooperate with the seats 19 and 20. The inner end of the shaft 12 projects into the valve chamber 2 and is provided with a circumferential groove 22 in which the balls 21 engage. The grooved inner end of the shaft 12 is eccentrically disposed with respect to that portion of the shaft which is journalled in the valve body, as clearly shown in Fig. 1.

The two balls 21 are mounted in a ball retainer 23 which is shown alone in Figs. 4–7. The ball retainer may be conveniently made by shaping and then assembling two sheet metal blanks 24 of the kind shown in Fig. 3. Each blank has upper and lower transversely extending portions 25 and 26 connected by vertical side strips 27 and 28. Each blank is pressed to give its upper and lower transverse portions 25 and 26 a semi-circular shape, and the two blanks thus formed are then assembled as shown in Fig. 4 and are soldered together or otherwise firmly united along the vertical strips 27 and 28. Fig. 5 shows in side elevation one of the ball retainers thus made. It will be clear from this figure that the ball retainer thus made has upper and lower ball-retaining rings 29 and 30 held apart by spacers 27' and 28'. The upper edge of the upper ring 29 is preferably bent inwardly as shown at 31, and the lower edge of the lower ring 30 is similarly bent inwardly as shown at 32. This may be done when the transverse portions 25, 26 of the blanks are formed to their semi-circular shape. One of the balls 21 is inserted upwardly into the upper ring 29 until it bears against its inwardly turned upper edge 31 of the ring. Similarly, the other ball is inserted downwardly into the lower ring 30 until it bears against the inwardly turned lower edge 32 of this ring. The lower edge of the upper ring and the upper edge of the lower ring are then crimped inwardly as shown at 33 and 34, respectively, in Fig. 6 to retain the two balls in the two rings. Instead of turning in the edges of the two ball-retaining rings throughout the entire circumference of each ring, narrow tongues of metal at the edges may be bent inwardly to perform the same function.

The completed ball retainer containing the two balls is positioned in the valve chamber 2 so that the two spacers 27' and 28' bear at their outer edges against the inner wall of the valve chamber as shown at Fig. 2 and so that the eccentric end of the shaft 12 can enter the central space in the ball retainer. The ball retainer, with the two balls, is then forced onto the end of the shaft so that the balls snap into the groove 22 at the end of the shaft. The ball retainer keeps the two balls spaced a predetermined distance apart and in engagement with the groove in the eccentric end of the shaft. When the shaft is rotated, the eccentric end of the shaft moves the two balls in unison up or down to move one of the balls against its seat and to move the other ball away from its seat. In Fig. 1 the shaft is shown rotated to a position in which the upper ball is seated and the lower ball is unseated, whereas in Fig. 2 the shaft is shown in an intermediate position in which both balls are unseated. Counterclockwise rotation of the shaft from the Fig. 2 position through approximately 90° will completely unseat the upper ball and will seat the lower ball.

The valve body may be mounted in any suitable way as by attaching it to the wall 35 of a housing or casing by means of screws 36 (Fig. 1). The outer end of the shaft 12 has secured to it a valve handle of any suitable type such as the plastic pointer knob shown at 37.

It will now be seen that by turning the knob 37 one of the balls is positively forced against its seat and the other ball is positively withdrawn from its seat. Since the shaft has rolling contact with the balls, it may be turned with a minimum of effort. The balls are guided in a rectilinear path toward and away from the valve seats due to the fact that the edges of the spacers 27' and 28' of the ball retainer slide in contact with the wall of the valve chamber. Displacement of the balls axially of the shaft is, of course, prevented by the shaft groove in which they roll. When one of the balls is positively seated the other ball is positively moved away from its seat by the ball retainer because the retainer always keeps the two balls spaced a predetermined distance apart.

The valve may be used for controlling the flow of any fluid such as water or gas and may be used to control and distribute the fluid in any desired way. For instance, fluid may be admitted to the passage 5 from the passage 4 when the lower ball is unseated and the upper ball is seated, and fluid may be delivered to the passage 5 from the passage 3 when the upper ball is unseated and the lower ball is seated. Or, fluid delivered through the passage 5 can be discharged either through the lower passage 4 or the upper passage 3, depending upon which passage is opened and which one is closed by the balls.

Since the balls have rolling contact with the shaft they are continually turned to present new surfaces for contact with the seats, thereby assuring long and even wear and proper seating of the balls at all times.

While the invention has been described as applied to a three-way valve, the principle is applicable in its broader aspects to valves having only one valve element and one valve seat. For example, either of the fluid passages 3 and 4 could be omitted together with its valve seat, in which case the corresponding ball, although no longer functioning as a valve element, would co-operate with the other ball and the ball retainer to cause positive seating and unseating of such other ball which would then constitute the sole valve element to control the flow of fluid between the remaining two fluid passages.

I claim:

1. A valve comprising a body having a valve chamber therein, fluid passages communicating with said chamber, a pair of balls in said chamber, a valve stem rotatably mounted in the body and having an eccentric end portion projecting into said chamber, a ball retainer holding said balls in predetermined spaced relation and in engagement with the eccentric end portion of the valve stem, said ball retainer being guided in said valve chamber to cause the balls to move rectilinearly in the direction in which they are spaced, and a valve seat at the inner end of at least one of said fluid passages with which one of said balls cooperates, whereby rotation of the valve stem causes its eccentric end to move said balls rectilinearly in unison and to positively seat and unseat said ball that cooperates with the valve seat.

2. A valve comprising a body having a valve chamber therein, fluid passages communicating with said chamber, a pair of balls in said chamber, a valve stem rotatably mounted in the body and having an eccentric end portion projecting into said chamber, said eccentric end portion having a circumferential groove, a ball retainer holding said balls in predetermined spaced relation and in engagement with said groove, said ball retainer being guided in said valve chamber to cause the balls to move rectilinearly in the direction in which they are spaced, and a valve seat at the inner end of at least one of said fluid passages with which one of said balls cooperates, whereby rotation of the valve stem causes its grooved eccentric end to move said balls rectilinearly in unison and to positively seat and unseat said ball that cooperates with the valve seat.

3. A valve comprising a body having a valve chamber therein, oppositely disposed fluid passages communicating with said chamber, a valve seat at the inner end of each fluid passage, a pair of balls in said chamber each of which constitutes a valve element cooperating with one of said seats, a valve stem rotatably mounted in the body and having an eccentric end portion projecting into said chamber, and a ball retainer holding said balls in predetermined spaced relation and in engagement with the eccentric end of the valve stem, said ball retainer being guided in said valve chamber to cause the balls to move rectilinearly in the direction in which they are spaced, whereby rotation of the valve stem causes its eccentric end to positively seat one of the balls and positively unseat the other.

4. A valve comprising a body having a valve chamber therein, oppositely disposed fluid passages communicating with said chamber, a valve seat at the inner end of each fluid passage, a pair of balls in said chamber each of which constitutes a valve element cooperating with one of said seats, a valve stem rotatably mounted in the body and having an eccentric end portion projecting into said chamber, said eccentric end portion of the valve stem having a circumferential groove, and a ball retainer holding said balls in predetermined spaced relation and in engagement with said groove, said ball retainer being guided in said valve chamber to cause the balls to move rectilinearly in the direction in which they are spaced, whereby rotation of the valve stem causes its grooved eccentric end to positively seat one of the balls and positively unseat the other.

THEODORE F. SCHLICKSUPP.

REFERENCES CITED

The following references are of record in the file of this patent:

UNITED STATES PATENTS

| Number | Name | Date |
|---|---|---|
| 1,044,124 | Bessert | Nov. 12, 1912 |
| 1,553,372 | Eble | Sept. 15, 1925 |
| 1,675,979 | Laird | July 3, 1928 |
| 1,886,889 | Krupp | Nov. 8, 1932 |
| 2,024,548 | Struve | Dec. 17, 1935 |

FOREIGN PATENTS

| Number | Country | Date |
|---|---|---|
| 347,776 | Germany | Jan. 26, 1922 |
| 512,449 | Germany | Nov. 12, 1930 |